(12) United States Patent
Nagashima

(10) Patent No.: US 11,577,381 B2
(45) Date of Patent: Feb. 14, 2023

(54) TEACHING APPARATUS, ROBOT SYSTEM, AND TEACHING PROGRAM

(71) Applicant: Seiko Epson Corporation, Tokyo (JP)

(72) Inventor: Yoshiki Nagashima, Shiojiri (JP)

(73) Assignee: SEIKO EPSON CORPORATION

( * ) Notice: Subject to any disclaimer, the term of this patent is extended or adjusted under 35 U.S.C. 154(b) by 149 days.

(21) Appl. No.: 17/104,724

(22) Filed: Nov. 25, 2020

(65) Prior Publication Data
US 2021/0162582 A1   Jun. 3, 2021

(30) Foreign Application Priority Data
Nov. 29, 2019   (JP) .............................. JP2019-217325

(51) Int. Cl.
*G05B 19/042* (2006.01)
*B25J 9/00* (2006.01)
*B25J 13/08* (2006.01)
*B25J 9/16* (2006.01)

(52) U.S. Cl.
CPC ............. *B25J 9/0081* (2013.01); *B25J 9/161* (2013.01); *B25J 9/1689* (2013.01); *B25J 13/089* (2013.01)

(58) Field of Classification Search
CPC ........ B25J 9/0081; B25J 9/161; B25J 9/1689; B25J 13/089; G05B 19/0426; G05B 19/37453
USPC ..... 700/264, 250; 318/568.1, 568.13; 901/1, 901/3, 30
See application file for complete search history.

(56) References Cited

U.S. PATENT DOCUMENTS

| | | | | |
|---|---|---|---|---|
| 5,937,143 A | * | 8/1999 | Watanabe | B25J 9/1671 700/264 |
| 7,447,564 B2 | * | 11/2008 | Yasukawa | B25J 9/0003 379/38 |
| 7,501,778 B2 | * | 3/2009 | Hashimoto | B25J 9/1674 901/1 |
| 7,801,644 B2 | * | 9/2010 | Bruemmer | G06N 3/008 318/568.17 |
| 8,005,572 B2 | * | 8/2011 | Evans | B25J 9/1656 318/568.22 |
| 2002/0107612 A1 | | 8/2002 | Hiruma | |

FOREIGN PATENT DOCUMENTS

| | | |
|---|---|---|
| JP | 2006-142480 A | 6/2006 |
| JP | 2007-188537 A | 7/2007 |
| JP | 2007-193846 A | 8/2007 |
| JP | 2011-059801 A | 3/2011 |

* cited by examiner

*Primary Examiner* — Dalena Tran
(74) *Attorney, Agent, or Firm* — Harness, Dickey & Pierce, P.L.C.

(57) ABSTRACT

A teaching apparatus includes a display unit that displays a command display area in which a plurality of input motion commands of a robot are displayed, an extraction display area in which at least one motion command extracted from the plurality of motion commands displayed in the command display area is displayed, and a settings input area in which details of the extracted motion command are set, and a display control unit that controls actuation of the display unit, wherein the display control unit extracts and displays a motion command related to one of position information, velocity information, and acceleration information of the robot out of the plurality of motion commands displayed in the command display area in the extraction display area.

5 Claims, 9 Drawing Sheets

TEACHING APPARATUS, ROBOT SYSTEM, AND TEACHING PROGRAM

The present application is based on, and claims priority from JP Application Serial Number 2019-217325, filed Nov. 29, 2019, the disclosure of which is hereby incorporated by reference herein in its entirety.

BACKGROUND

1. Technical Field

The present disclosure relates to a teaching apparatus, a robot system, and a teaching program.

2. Related Art

Teaching apparatuses used prior to various types of work by robots for teaching details of the work to the robots are known. A teaching apparatus disclosed in JP-A-2006-142480 has a configuration to which an operator inputs a robot language to create a motion program of a robot. The motion program is input to the robot, and teaching is performed.

However, in JP-A-2006-142480, in the input motion program, a plurality of items including position information of the robot, a motion velocity of the robot, and a motion acceleration of the robot are mixed. Accordingly, for example, when the operator desires to edit or correct a specific item after creation, the operator needs to find the item from the all items and the operation is complex.

SUMMARY

The present disclosure has been achieved to solve at least a part of the above described problem and can be realized as below.

A teaching apparatus of an application example includes a display unit that displays a command display area in which a plurality of input motion commands of a robot are displayed, an extraction display area in which at least one motion command extracted from the plurality of motion commands displayed in the command display area is displayed, and a settings input area in which details of the extracted motion command are set, and a display control unit that controls actuation of the display unit, wherein the display control unit extracts and displays a motion command related to one of position information, velocity information, and acceleration information of the robot out of the plurality of motion commands displayed in the command display area in the extraction display area.

A robot system of an application example includes the teaching apparatus according to the present disclosure and a robot that executes a motion program created by the teaching apparatus.

A non-transitory computer-readable storage medium storing a teaching program of an application example, the teaching program is for execution of displaying a command display area in which a plurality of input motion commands are displayed in a display unit, and extracting a motion command related to one of position information, velocity information, and acceleration information of a robot out of the plurality of motion commands displayed in the command display area and displaying an extraction display area and a settings input area in which details of the extracted motion command are set.

DESCRIPTION OF EXEMPLARY EMBODIMENTS

As below, a teaching apparatus, a robot system, and teaching program according to the present disclosure will be explained in detail based on preferred embodiments shown in the accompanying drawings.

First Embodiment

Figure 1:
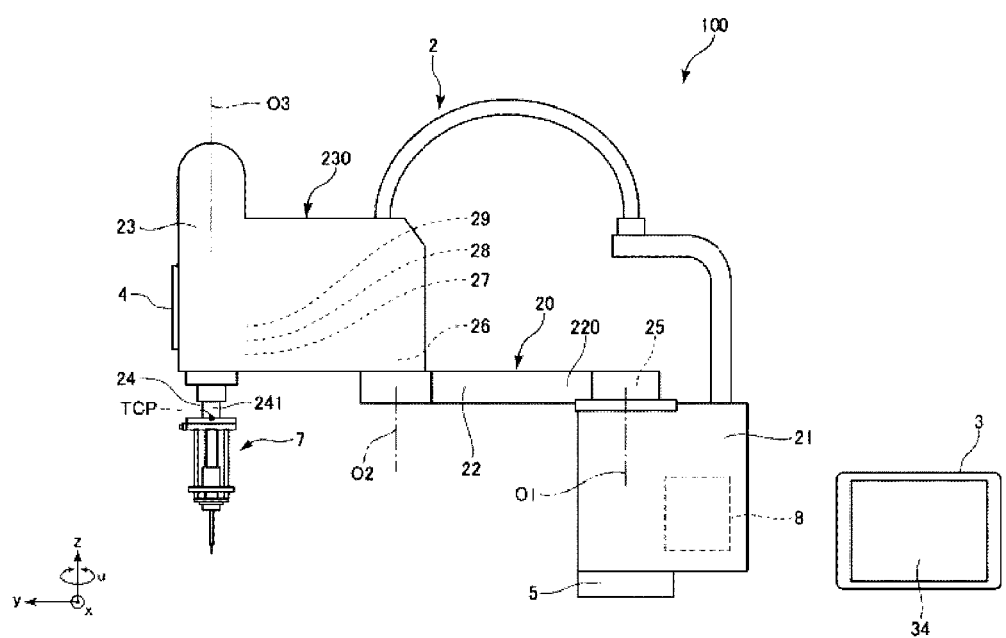
FIG. 1 is a schematic configuration diagram of a robot system including a teaching apparatus according to the present disclosure.
Figure 2:
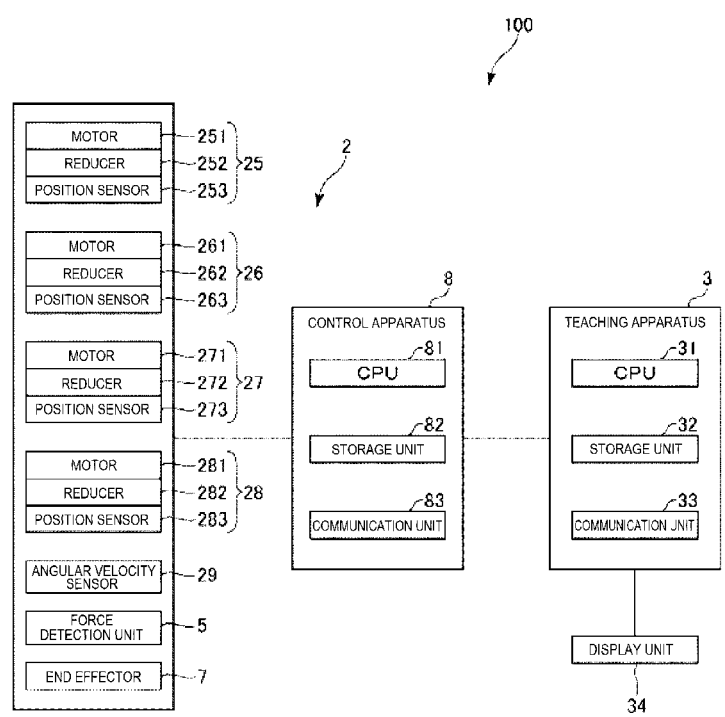
FIG. 2 is a block diagram of the robot system shown in FIG. 1.
Figure 3:
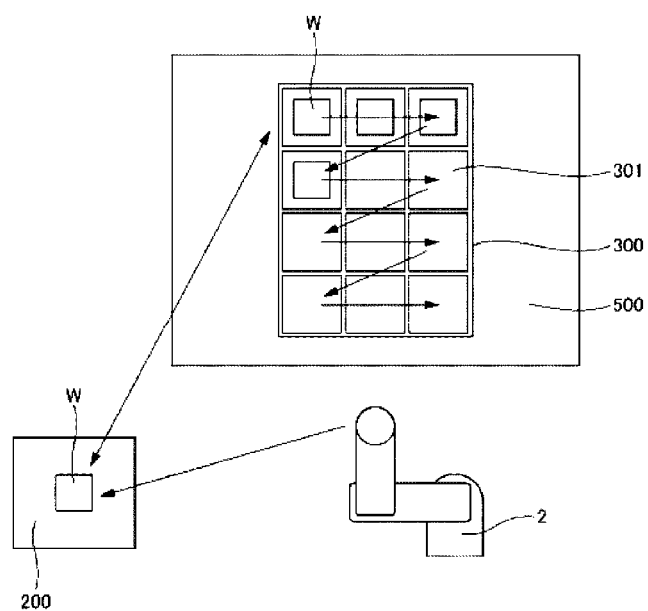
FIG. 3 is a diagram for explanation of a motion program of a robot shown in FIG. 1.
Figure 4:
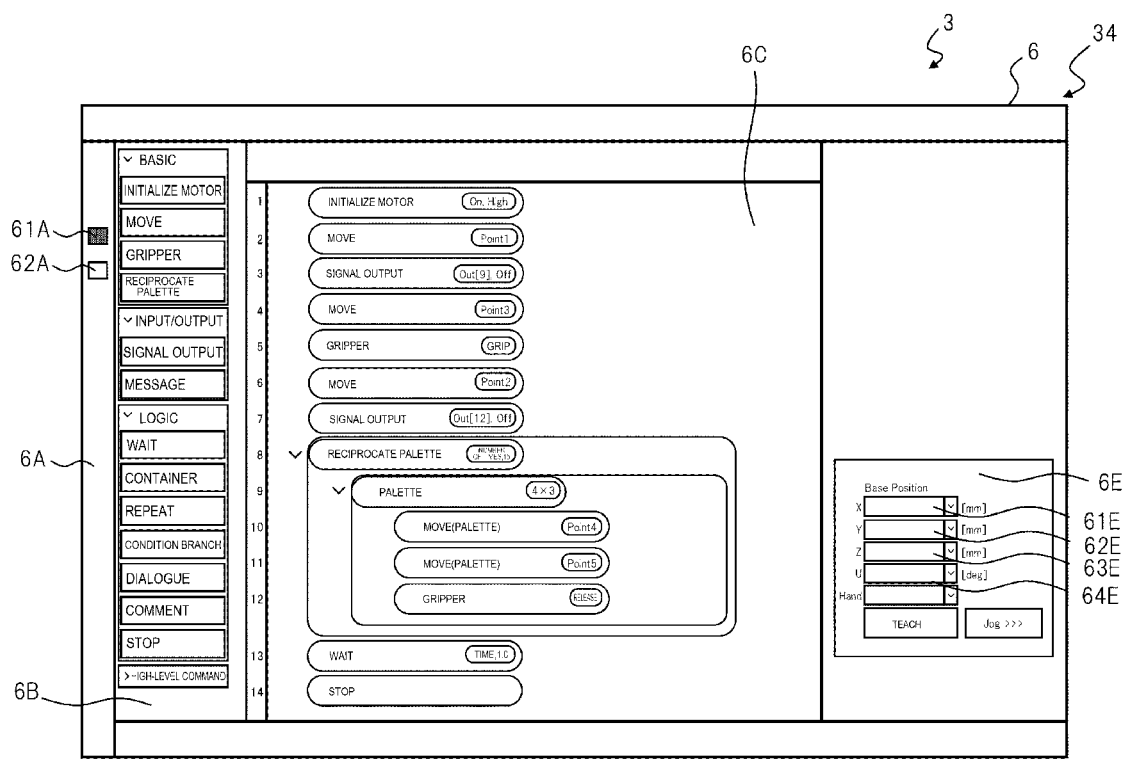
FIG. 4 shows a display screen of a display unit of the teaching apparatus shown in FIG. 1.
Figure 5:
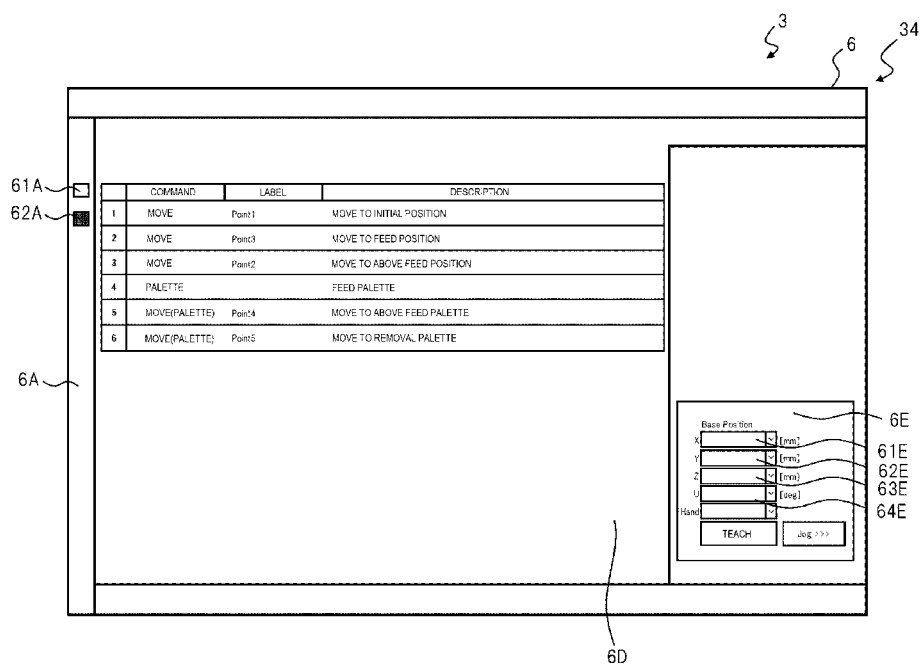
FIG. 5 shows the display screen of the display unit of the teaching apparatus shown in FIG. 1.
Figure 6:
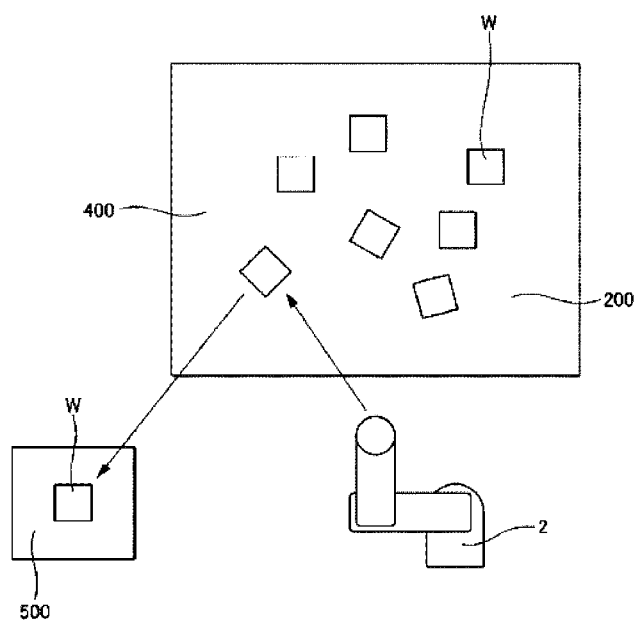
FIG. 6 is a diagram for explanation of a motion program of the robot shown in FIG. 1.
Figure 7:
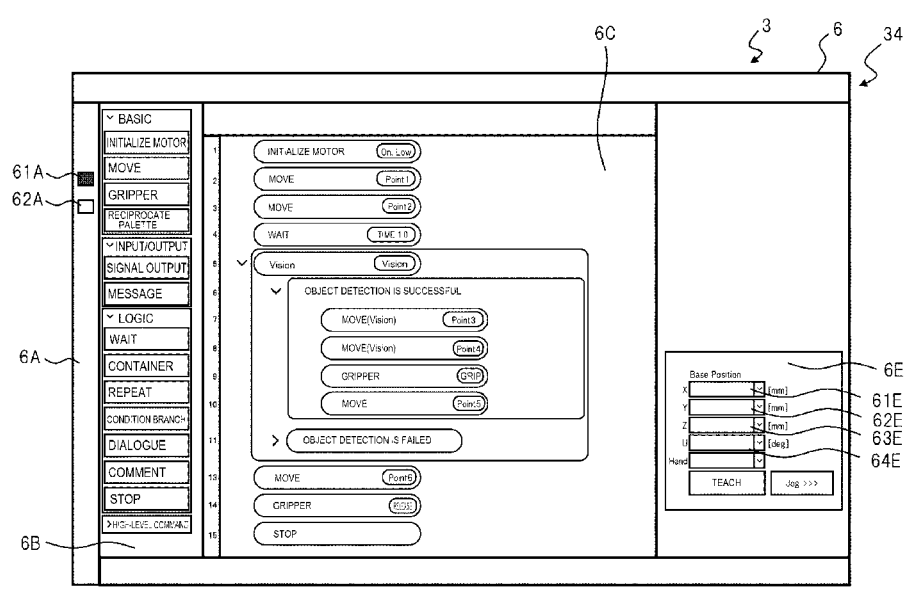
FIG. 7 shows the display screen of the display unit of the teaching apparatus shown in FIG. 1.
Figure 8:
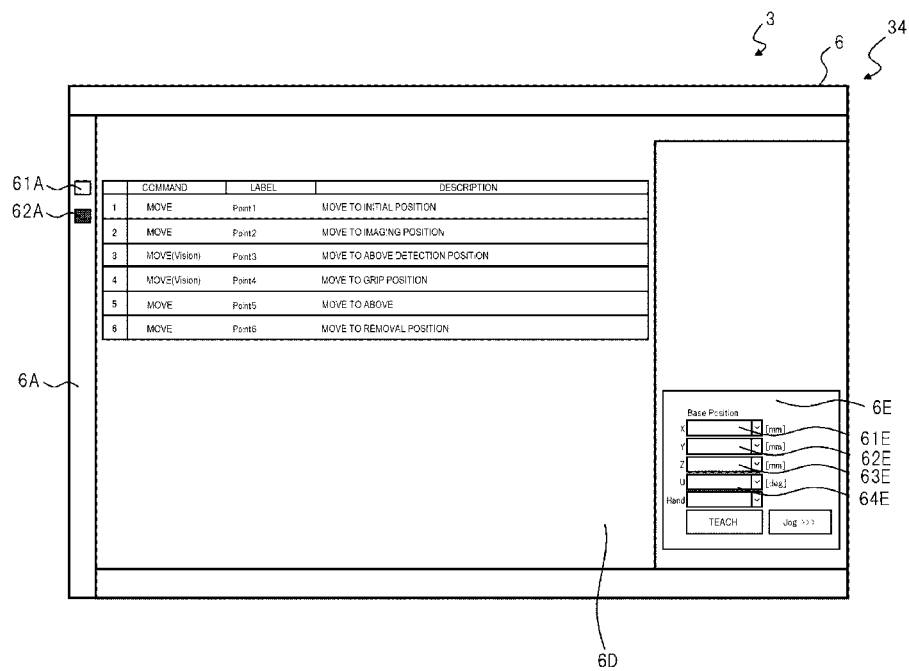
FIG. 8 shows the display screen of the display unit of the teaching apparatus shown in FIG. 1.
Figure 9:
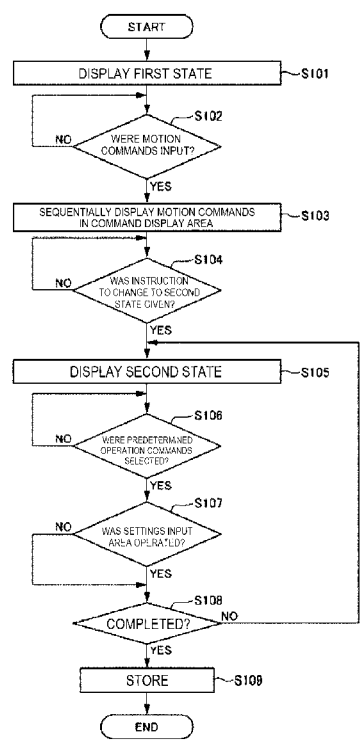
FIG. 9 is a flowchart for explanation of a control method for the teaching apparatus shown in FIG. 1.

FIG. 1 is the schematic configuration diagram of the robot system including the teaching apparatus according to the present disclosure. FIG. 2 is the block diagram of the robot system shown in FIG. 1. FIG. 3 is the diagram for explanation of a motion program of the robot shown in FIG. 1. FIG. 4 shows a display screen of a display unit of the teaching apparatus shown in FIG. 1. FIG. 5 shows the display screen of the display unit of the teaching apparatus shown in FIG. 1. FIG. 6 is the diagram for explanation of the motion program of the robot shown in FIG. 1. FIG. 7 shows the display screen of the display unit of the teaching apparatus shown in FIG. 1. FIG. 8 shows the display screen of the display unit of the teaching apparatus shown in FIG. 1. FIG. 9 is the flowchart for explanation of a control method for the teaching apparatus shown in FIG. 1.

In FIG. 1, for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions". Further, hereinafter, the pointer sides of the respective arrows in the drawings are referred to as "+ (plus)" and the tail sides are referred to as "− (minus)", and directions about the z-axis and directions about an axis parallel to the z-axis are also referred to as "u-axis directions".

Hereinafter, for convenience of explanation, the +z-axis direction, i.e., the upside in FIG. 1 is also referred to as "upper" or "above" and the −z-axis direction, i.e., the downside is also referred to as "lower" or "below". Further, with respect to a robot arm 20, a base 21 side in FIG. 1 is referred to as "proximal end" and the opposite side, i.e., an end effector 7 side is referred to as "distal end". Furthermore, the z-axis directions, i.e., upward and downward directions in FIG. 1 are referred to as "vertical directions" and the x-axis directions and the y-axis directions, i.e., leftward and rightward directions are referred to as "horizontal directions".

A robot system 100 shown in FIGS. 1 and 2 is used for work of e.g. holding, transport, assembly, inspection, etc. of workpieces including electronic components and electronic apparatuses. The robot system 100 includes a robot 2 and a teaching apparatus 3 that teaches a motion program to the robot 2. The robot 2 and the teaching apparatus 3 can communicate via wired or wireless connection and the communication may be made via a network such as the Internet.

Teaching refers to designation of a motion program for the robot 2 and specifically refers to input of a position and a posture of the robot arm 20 to a control apparatus 8. The teaching includes direct teaching and indirect teaching, and the present disclosure relates to indirect teaching using the teaching apparatus 3.

The direct teaching refers to storage of motion of the robot arm 20 in the control apparatus 8 or the teaching apparatus 3 by moving the robot arm 20 into predetermined position and posture while applying an external force to the robot arm 20 and operating a teach button of a receiving unit 4 at a desired time.

Further, the indirect teaching refers to creation of a motion program on a display screen 6 of a display unit 34, which will be described later, and storage of the created motion program in the control apparatus 8 or the teaching apparatus 3.

First, the robot 2 is explained.

The robot 2 is a horizontal articulated robot, i.e., a scalar robot in the illustrated configuration. As shown in FIG. 1, the robot 2 includes a base 21, the robot arm 20 coupled to the base 21, the receiving unit 4 that receives a predetermined operation from an operator, a force detection unit 5, an end effector 7, and the control apparatus 8 that controls actuation of these respective units.

The base 21 is a part supporting the robot arm 20. In the base 21, the control apparatus 8, which will be described later, is provided. Further, in an arbitrary portion of the base 21, the origin of a robot coordinate system is set. Note that the x-axis, the y-axis, and the z-axis shown in FIG. 1 are the axes of the robot coordinate system.

The robot arm 20 includes a first arm 22, a second arm 23, and a third arm 24 as a working head. Note that the robot 2 is not limited to the illustrated configuration, and the number of arms may be one or two, or may be four or more.

Further, the robot 2 includes a drive unit 25 that rotates the first arm 22 relative to the base 21, a drive unit 26 that rotates the second arm 23 relative to the first arm 22, a u-drive unit 27 that rotates a shaft 241 of the third arm 24 relative to the second arm 23, a z-drive unit 28 that moves the shaft 241 in the z-axis directions relative to the second arm 23, and an angular velocity sensor 29.

As shown in FIGS. 1 and 2, the drive unit 25 is provided inside of a housing 220 of the first arm 22 and has a motor 251 that generates a drive force, a reducer 252 that reduces the drive force of the motor 251, and a position sensor 253 that detects the rotation angle of the rotation shaft of the motor 251 or the reducer 252.

The drive unit 26 is provided inside of a housing 230 of the second arm 23 and has a motor 261 that generates a drive force, a reducer 262 that reduces the drive force of the motor 261, and a position sensor 263 that detects the rotation angle of the rotation shaft of the motor 261 or the reducer 262.

The u-drive unit 27 is provided inside of the housing 230 of the second arm 23 and has a motor 271 that generates a drive force, a reducer 272 that reduces the drive force of the motor 271, and a position sensor 273 that detects the rotation angle of the rotation shaft of the motor 271 or the reducer 272.

The z-drive unit 28 is provided inside of the housing 230 of the second arm 23 and has a motor 281 that generates a drive force, a reducer 282 that reduces the drive force of the motor 281, and a position sensor 283 that detects the rotation angle of the rotation shaft of the motor 281 or the reducer 282.

As the motor 251, the motor 261, the motor 271, and the motor 281, servo motors such as AC servo motors or DC servo motors may be used, for example.

As the reducer 252, the reducer 262, the reducer 272, and the reducer 282, planet gear reducers, wave gearings, or the like may be used, for example. Further, as the position sensor 253, the position sensor 263, the position sensor 273, and the position sensor 283, angle sensors or the like may be used.

The drive unit 25, the drive unit 26, the u-drive unit 27, and the z-drive unit 28 are each coupled to corresponding motor drivers (not shown) and controlled by a robot control unit 11 of the control apparatus 8 via the motor drivers.

As shown in FIG. 2, the angular velocity sensor 29 is provided inside of the second arm 23. Accordingly, the sensor may detect the angular velocity of the second arm 23. The control apparatus 8 performs control of the robot 2 based on information of the detected angular velocity.

The base 21 is fixed to, e.g., a floor surface (not shown) by bolts or the like. The first arm 22 is coupled to the upper end portion of the base 21. The first arm 22 is rotatable about a first axis O1 along the vertical directions relative to the base 21. When the drive unit 25 that rotates the first arm 22 drives, the first arm 22 rotates within a horizontal plane about the first axis O1 relative to the base 21. The position sensor 253 is configured to detect the amount of rotation of the first arm 22 relative to the base 21.

The second arm 23 is coupled to the distal end portion of the first arm 22. The second arm 23 is rotatable about a second axis O2 along the vertical directions relative to the first arm 22. The axial direction of the first axis O1 and the axial direction of the second axis O2 are the same. That is, the second axis O2 is parallel to the first axis O1. When the drive unit 26 that rotates the second arm 23 drives, the second arm 23 rotates within a horizontal plane about the second axis O2 relative to the first arm 22. The position sensor 263 is configured to detect the amount of drive, specifically, the amount of rotation of the second arm 23 relative to the first arm 22.

The third arm 24 is placed and supported in the distal end portion of the second arm 23. The third arm 24 has the shaft 241. The shaft 241 is rotatable about a third axis O3 along the vertical directions relative to the second arm 23 and movable in the upward and downward directions. The shaft 241 is the arm at the most distal end of the robot arm 20.

When the u-drive unit 27 that rotates the shaft 241 drives, the shaft 241 rotates about the z-axis. Further, the position sensor 273 is configured to detect the amount of rotation of the shaft 241 relative to the second arm 23.

When the z-drive unit 28 that moves the shaft 241 in the z-axis directions drives, the shaft 241 moves in the upward and downward directions, i.e., the z-axis directions. Further, the position sensor 283 is configured to detect the amount of movement of the shaft 241 in the z-axis directions relative to the second arm 23.

In the robot 2, with the distal end of the shaft 241 as a control point TCP, a distal end coordinate system having the origin at the control point TCP is set. The distal end coordinate system and the above-described robot coordinate system were calibrated and a position in the distal end coordinate system may be transformed into that in the robot coordinate system. Thereby, the position of the control point TCP may be located in the robot coordinate system.

Further, various end effectors are detachably coupled to the distal end portion of the shaft 241. The end effector is not particularly limited, and examples thereof include one that grips an object to be transported, one that processes an object to be processed, and one used for inspection. In the embodiment, the end effector 7 is detachably coupled.

The end effector 7 is not a component element of the robot 2 in the embodiment, but, a part or entire of the end effector 7 may be a component element of the robot 2.

As shown in FIG. 1, the force detection unit 5 detects a force applied to the robot 2, i.e., a force applied to the robot arm 20 and the base 21. In the embodiment, the force detection unit 5 is provided at the downside, i.e., the −z-axis side of the base 21 and supports the base 21 from the downside.

The force detection unit 5 may include a plurality of elements formed using a piezoelectric material such as quartz crystal and outputting electric charge when subjected to an external force. The control apparatus 8 may perform conversion into an external force applied to the robot arm 20 according to the amounts of electric charge. Further, such a piezoelectric material can adjust the direction in which the electric charge can be generated when subjected to the external force according to the direction in which the material is placed.

The receiving unit 4 is a part that receives the predetermined operation by the operator. The receiving unit 4 has a teaching button (not shown). The teaching button may be used when direct teaching is performed. The teaching button may be a mechanical button or touch-electric button. Further, a button having a different function may be placed around the operation button.

Next, the control apparatus 8 will be explained.

As shown in FIGS. 1 and 2, the control apparatus 8 is provided inside of the base 21 in the embodiment. Further, as shown in FIG. 2, the control apparatus 8 has a function of controlling driving of the robot 2 and is electrically coupled to the above-described respective parts of the robot 2. The control apparatus 8 includes a CPU (Central Processing Unit) 81, a storage unit 82, and a communication unit 83. These respective units are coupled communicably with one another via a bus or the like.

The CPU 81 reads and executes various programs etc. stored in the storage unit 82. A command signal generated in the CPU 81 is transmitted to the robot 2 via the communication unit 83. Thereby, the robot arm 20 may execute predetermined work.

The storage unit 82 stores various programs etc. that can be executed by the CPU 81. Examples of the storage unit 82 include a volatile memory such as a RAM (Random Access Memory), a nonvolatile memory such as a ROM (Read Only Memory), and a detachable external storage device.

The communication unit 83 transmits and receives signals between the respective parts of the robot 2 and the teaching apparatus 3 using, for example, an external interface such as a wired LAN (Local Area Network) or a wireless LAN.

Next, the teaching apparatus 3 will be explained.

As shown in FIG. 2, the teaching apparatus 3 has a function of controlling actuation of the robot arm 20 and has a CPU (Central Processing Unit) 31, a storage unit 32, a communication unit 33, and the display unit 34. The teaching apparatus 3 is not particularly limited, and examples thereof include a tablet, a personal computer, and a smartphone.

The CPU 31 reads and executes various programs etc. stored in the storage unit 32. The various programs include, for example, a teaching program according to the present disclosure, which will be described later. The teaching program may be one generated in the teaching apparatus 3, one stored from an external recording medium such as a CD-ROM, or one stored via a network or the like.

The signal generated in the CPU 31 is transmitted to the control apparatus 8 of the robot 2 via the communication unit 33. Thereby, the robot arm 20 may execute predetermined work under a predetermined condition and perform teaching. Further, the CPU 31 controls driving of the display unit 34 shown in FIGS. 3 to 9. That is, the CPU 31 functions as a display control unit that controls actuation of the display unit 34.

The storage unit 32 stores various programs etc. that can be executed by the CPU 31. Examples of the storage unit 32 include a volatile memory such as a RAM (Random Access Memory), nonvolatile memory such as a ROM (Read Only Memory), and a detachable external storage device.

The communication unit 33 transmits and receives signals between the control apparatus 8 and itself using, for example, an external interface such as a wired LAN (Local Area Network) or a wireless LAN.

The display unit 34 includes various displays having a display screen 6. In the embodiment, as an example, a touch panel configuration, i.e., a configuration in which the display unit 34 has a display function and an input operation function is explained. When the operator contacts, that is, touches the display screen 6, the CPU 31 performs control to change to predetermined display.

Note that the display unit is not limited to the configuration, and may separately include an input operation unit. In this case, the input operation unit includes a mouse and keyboard. Or, a configuration using both a touch panel and a mouse and keyboard may be employed. That is, the input operation to be described may include moving and selecting a cursor displayed on the display screen 6 using the mouse, keyboard, or the like.

During indirect teaching (hereinafter, simply referred to as "during teaching"), the display unit 34 displays a window as shown in FIGS. 4, 5, 7, and 8 on the display screen 6. The window has a task bar 6A, a command input area 6B, a command display area 6C, an extraction display area 6D, and a settings input area 6E. That is, the display unit 34 displays the task bar 6A, the command input area 6B, the command display area 6C, the extraction display area 6D, and the settings input area 6E.

Further, the CPU 31 controls actuation of the display unit 34 to switch between a first state in which the task bar 6A, the command input area 6B, the command display area 6C, and the settings input area 6E are displayed as shown in FIGS. 4 and 7 and a second state in which the task bar 6A, the extraction display area 6D, and the settings input area 6E are displayed as shown in FIGS. 5 and 8.

The task bar 6A is an area located on the left side within the display screen 6 for displaying a plurality of buttons and icons. The task bar 6A has a first state select button 61A for selecting the first state and a second state select button 62A for selecting the second state. The operator touches the position corresponding to the first state select button 61A of the display screen 6, and thereby the first state is selected, and the operator touches the position corresponding to the second state select button 62A, and thereby the second state is selected. That is, the command display area 6C and the extraction display area 6D are alternatively switched according to the switching between the first state and the second state.

As described above, the CPU 31 as a display control unit displays only one of the command display area 6C and the extraction display area 6D. Thereby, as will be described later, the screen in which all of the selected motion programs are displayed and the screen in which only the motion command having desired details is displayed may be switched. Therefore, a desired motion program may be easily found and teaching may be easily performed.

The command input area 6B sequentially displays the plurality of motion commands from the top. The motion command refers to a unit motion command to be taught to the robot 2 and various motion commands that can be executed by the robot 2 are displayed in the command input area 6B.

In the configurations shown in FIGS. 4 and 7, an input button indicating "Initialize Motor", an input button indicating "Move", an input button indicating "Gripper", an input button indicating "Reciprocate Palette", an input button indicating "Input/Output", an input button indicating "Signal Output", an input button indicating "Message", an input button indicating "Logic", an input button indicating "Wait", an input button indicating "Container", an input button indicating "Repeat", an input button indicating "Condition Branch", an input button indicating "Dialogue", and an input button indicating "Stop" are sequentially displayed from the top. These input buttons are command input portions for operation of inputting motion commands of the robot 2.

The operator sequentially touches the positions corresponding to the command input area 6B of the display screen 6 according to the motion desired to be performed by the robot 2, and thereby, the commands are sequentially displayed from the top in the command display area 6C.

As described above, the CPU 31 as the display control unit displays the command input area 6B having the input buttons as the command input portions for operation of inputting motion commands of the robot 2. Thereby, the motion program may be created by the simple method of operating the input buttons corresponding to the desired motion program.

Here, when the motion as shown in FIG. 3 is desired to be performed by the robot 2, the motion program as shown in FIG. 4 is created. The motion shown in FIG. 3 is a motion to grip workpieces W from a feed location 200 where the workpieces W are fed and sequentially place the workpieces W in pockets 301 of a palette 300 by the robot 2. In this case, as shown in FIG. 4, the input button of "Initialize Motor", the input button of "Move", the input button of "Signal Output", the input button of "Move", the input button of "Gripper", the input button of "Move", the input button of "Signal Output", the input button of "Reciprocate Palette", the input button of "Wait", and the input button of "Stop" are sequentially touched.

Thereby, in the command display area 6C, an icon of "Initialize Motor", an icon of "Move", an icon of "Signal Output", an icon of "Move", an icon of "Gripper", an icon of "Move", an icon of "Signal Output", an icon of "Reciprocate Palette", an icon of "Wait", and an icon of "Stop" are sequentially displayed from the top and the sequence of the unit motion programs may be set.

The icon of "Reciprocate Palette" is touched, then, various settings are made, and thereby, within the icon of "Reciprocate Palette", an icon of "Palette", an icon of "Move", an icon of "Move", and an icon of "Gripper" are sequentially displayed from the top. That is, the motion to be performed by the robot 2 may be set in the palette 300.

Further, for example, when the motion shown in FIG. 6 is desired to be performed by the robot 2, the motion program as shown in FIG. 7 is created. The motion shown in FIG. 6 is a motion to grip workpieces W from a table 400 on which the workpieces W are placed and sequentially transport the workpieces W to a removal location 500. In this case, as shown in FIG. 7, the input button of "Initialize Motor", the input button of "Move", the input button of "Move", the input button of "Wait", an input button of "High-level Command", the input button of "Move", the input button of "Gripper", and the input button of "Stop" are sequentially touched.

Thereby, in the command display area 6C, the icon of "Initialize Motor", the icon of "Move", the icon of "Move", the icon of "Wait", an icon of "Vision", the icon of "Move", the icon of "Gripper", and the icon of "Stop" are sequentially displayed from the top.

Further, after the input button of "High-level Command" is pressed, "Vision" (not shown) is input, then, various settings are made, and thereby, an icon of "Move (Vision)", an icon of "Move (Vision)", an icon of "Gripper", and an icon of "Move" are sequentially displayed from the top. That is, various settings of a camera (not shown) for imaging the table 400 or the like may be performed.

As described above, in the teaching apparatus 3, the sequence of the motion program may be easily set.

As shown in FIGS. 4 and 7, the position corresponding to the icon displayed in the command display area 6C is touched, and thereby the icon is turned into the selected state. Then, in the state, the settings input area 6E is operated and set, and thereby, the position information of the robot 2, i.e., a target position where the control point of the robot 2 is moved in the motion program of the selected icon may be set.

As shown in FIGS. 4, 5, 7, and 8, the settings input area 6E is an area in which details of the selected command are input and, in the illustrated configuration, the position information may be input. Further, the settings input area 6E is displayed in both states of the first state and the second state. The settings input area 6E is displayed on the right side of the command display area 6C in the first state and displayed on the right side of the extraction display area 6D in the second state.

The settings input area 6E has an x input portion 61E for input of the position in the x-axis directions, i.e., coordinates in the robot coordinate system, a y input portion 62E for input of the position in the y-axis directions, i.e., coordinates in the robot coordinate system, a z input portion 63E for input of the position in the z-axis directions, i.e., coordinates in the robot coordinate system, and a u input portion 64E for input of the position in the u-axis directions, i.e., the amount of rotation of the shaft 241. Thereby, in the respective unit motion programs, the target position may be accurately input.

Here, as shown in FIGS. 4 and 7, the position information may be edited and corrected again after the sequence of the unit motion programs is set and settings of the position information are completed in the settings input area 6E. In related art, troublesome work of searching for a part corresponding to the position information from the program being created is performed. On the other hand, in the present disclosure, the above described problem may be solved by the following configuration. As below, FIGS. 4 and 5 will be explained as an example.

In the first state shown in FIG. 4, the position corresponding to the second state select button 62A is touched, and thereby, the second state is selected. In the second state, the command input area 6B and the command display area 6C shown in FIG. 4 are changed to the extraction display area 6D shown in FIG. 5.

In the extraction display area 6D, out of the plurality of motion commands displayed in the command display area 6C, the motion commands related to the position information of the robot 2 are extracted and displayed. That is, the CPU 31 controls the actuation of the display unit 34 to extract and display only the motion commands related to the position information of the robot 2 in the extraction display area 6D. Thereby, when editing the position information, the operator may view a list of only the motion commands related to the position information and promptly recognize and select the desired motion command.

Further, in the extraction display area 6D, the extracted motion commands can be alternatively selected. Then, in the settings input area 6E, parameters of the selected motion commands can be set. Thereby, the position information of the selected motion commands may be edited and corrected again.

As shown in FIG. 5, the extraction display area 6D and the settings input area 6E are collectively displayed in the display unit 34. That is, the CPU 31 as the display control unit collectively displays the extraction display area 6D and the settings input area 6E. Thereby, after the extracted motion commands in the extraction display area 6D are selected, the position information of the motion commands may be promptly input or corrected. Therefore, the teaching may be performed more easily.

Furthermore, in the extraction display area 6D, the extracted motion commands are displayed in the order of the input to the command display area 6C, i.e., in the chronological order. In other words, the CPU 31 as the display control unit displays the extracted motion commands in the extraction display area 6D in the chronological order. Thereby, when searching for the desired motion commands from the extraction display area 6D, the operator may find the commands more easily. Therefore, the teaching may be performed more easily.

After the second editing and correction of the position information of the motion commands are completed in the above described manner, when the position corresponding to a button of "Teach" in the settings input area 6E is touched in the display screen 6, the creation of the motion program is completed, the motion program is stored in the storage unit 32, and the teaching is completed.

As described above, the teaching apparatus 3 according to the present disclosure includes the display unit 34 that displays the command display area 6C in which the plurality of input motion commands of the robot are displayed, the extraction display area 6D in which at least one motion command extracted from the plurality of motion commands displayed in the command display area 6C, and the settings input area 6E in which the details of the extracted motion commands are set, and the CPU 31 as the display control unit that controls the actuation of the display unit 34. Further, the CPU 31 extracts and displays the motion commands related to one of the position information, the velocity information, and the acceleration information of the robot 2 out of the plurality of motion commands displayed in the command display area 6C, in the above description, the position information of the robot 2 in the extraction display area 6D. Thereby, when editing the details of the extracted motion commands, e.g., the position information, the operator may view the list of only the motion commands related to the position information and promptly recognize and select the desired motion commands. Therefore, teaching may be performed easily.

Note that, in the above description, the motion commands displayed in the extraction display area 6D are the motion commands related to the position information of the robot 2, but, the present disclosure is not limited to that. For example, the velocity information of the robot 2, i.e., the motion commands related to the velocity information of the respective parts of the robot arm 20 may be displayed, or the motion commands related to the acceleration information of the robot 2, i.e., the acceleration information of the respective parts of the robot arm 20 may be displayed.

When the motion commands extracted in the extraction display area 6D are the motion commands related to the velocity information of the robot 2, the settings input area 6E displays a velocity input portion for input of the velocity information of the robot 2. Or, when the motion commands extracted in the extraction display area 6D are the motion commands related to the acceleration information of the robot 2, the settings input area 6E displays an acceleration input portion for input of the acceleration information of the robot 2.

That is, the CPU 31 as the display control unit displays the settings input area 6E corresponding to the details of the extracted motion commands. Thereby, setting of the details may be made according to the extracted and displayed details.

Further, as described above, the display unit 34 displays the task bar 6A, the command input area 6B, the command display area 6C, the extraction display area 6D, and the settings input area 6E, but, the present disclosure is not limited to the illustrated layout. For example, single or pluralities of the task bars 6A, the command input areas 6B, the command display areas 6C, and the extraction display areas 6D may be displayed in respective different displays.

The robot system 100 according to the present disclosure includes the teaching apparatus 3, and the robot 2 that executes the motion program created by the teaching apparatus 3. Thereby, the robot system 100 that exerts the above described effects may be obtained.

As will be described below, the teaching program according to the present disclosure is a program for execution of displaying the command display area 6C in which the plurality of input motion commands are displayed in the display unit 34, extracting the motion commands related to one of the position information, the velocity information, and the acceleration information of the robot 2 out of the plurality of motion commands displayed in the command display area 6C and displaying the extraction display area 6D and the settings input area 6E in which the details of the extracted motion commands are set. Thereby, when editing the details of the extracted motion commands, e.g., the position information, the operator may view the list of only the motion commands related to the position information and promptly recognize and select the desired motion commands. Therefore, teaching may be performed easily.

Note that the teaching program according to the present disclosure may be one stored in the storage unit 32, one stored in a recording medium such as a CD-ROM, or one stored in a storage device capable of being coupled via a network or the like.

Next, the control operation performed by the CPU 31 will be explained according to the flowchart shown in FIG. 9.

First, at step S101, the first state is displayed. That is, as shown in FIGS. 4 and 7, the task bar 6A, the command input area 6B, the command display area 6C, and the settings input area 6E are displayed.

Then, at step S102, whether or not the motion command was input is determined. That is, whether or not the respective input buttons in the command input area 6B were pressed is determined. At step S102, when a determination that the motion commands were input is made, at step S103, the icons representing the selected motion commands are displayed in the command display area 6C in the chronological order.

Then, at step S104, whether or not an instruction to change to the second state was given is determined. That is, whether or not the second state select button 62A in the task bar 6A was touched is determined. At step S104, when a determination that the instruction to change to the second state was given is made, at step S105, the second state is displayed. That is, as shown in FIGS. 5 and 8, the task bar 6A, the extraction display area 6D, and the settings input area 6E are displayed on the display screen 6.

Then, at step S106, whether or not the predetermined motion command was selected is determined. That is, whether or not one of the icons displayed in the extraction display area 6D was touched is determined. At step S106, when a determination that the predetermined motion command was selected is made, at step S107, whether or not the settings input area 6E was operated is determined. That is, in the settings input area 6E, whether or not the position information was re-input is determined. Then, at step S108, whether or not the teaching program is completed is determined. That is, in the display screen 6, whether or not the position corresponding to the button of "Teach" in the settings input area 6E was touched is determined. At step S108, when a determination that the teaching program is completed is made, the current motion program and the settings thereof are stored in the storage unit 32 and the teaching program is completed.

As above, the teaching apparatus, the robot system, and the teaching program according to the present disclosure are explained based on the illustrated embodiments, but, the present disclosure is not limited to those. The configurations of the respective parts may be replaced by arbitrary configurations having the same functions. Further, other arbitrary configurations and steps may be added to each of the teaching apparatus, the control method, and the teaching program.

What is claimed is:

1. A teaching apparatus for a robot comprising:
a display configured to display a plurality of motion commands, a display screen of the display being divided into at least a first screen area and a second screen area;
a memory configured to store a pro cram and information relating to the plurality of motion commands for the robot; and
a processor configured to execute the program so as to:
cause the display to display a command display area and a command input area in the first screen area and a setting input area in the second screen area in a first mode, the plurality of motion commands being displayed in the command display area in the screen area, one of the plurality of motion commands being selectable through the command input area, details of a motion command of the plurality of motion commands being displayed in the setting input area in the second screen area;
select a first motion command from the displayed plurality of motion commands via the command input area;
change the first mode to a second mode after the selection of the first motion command; and
cause the display to switch the command display area and the command input area to an extraction display area in the first screen area and maintain the setting input area in the second screen area in the second mode,
wherein the first motion command relates to one of position information, velocity information, and acceleration information of the robot, and
the details of the first motion command are displayed in the extraction display area in the first screen area in the second mode.

2. The teaching apparatus according to claim 1, wherein the processor is further configured to cause the display to display the details of the first motion command in the extraction display area in the first screen area in a chronological order in the second mode.

3. The teaching apparatus according to claim 1, wherein the processor is further configured to cause the display to display the setting input area in the second screen area corresponding to the details of the first motion command in the second mode.

4. A robot system comprising:
the teaching apparatus according to claim 1; and
the robot configured to execute a motion program created by the teaching apparatus.

5. A non-transitory computer-readable storage medium storing a teaching program for causing a computer to execute a process by a processor so as to perform the steps of:
creating a command display area and a command input area in a first screen area of a display screen of a display and creating a setting input area in a second screen area of the display screen in a first mode, the first screen area being different front the second screen area;
displaying a plurality of motion commands in the command display area in the first screen area and displaying details of a motion command of the plurality of motion commands in the setting input area in the second screen area in the first mode;
selecting a first motion command from the displayed plurality of motion commands via the command input area in the first mode;
changing the first mode to a second mode after the selection of the first motion command; and
switching the command display area and the command input area to an extraction display area in the first screen area and maintaining the setting input area in the second screen area in the second mode,
wherein the first motion command relates to one of position information, velocity information, and acceleration information of a robot, and
the details of the first motion command are displayed in the extraction display area in the first screen area in the second mode.

* * * * *